Feb. 13, 1968  R. GUDMESTAD  3,368,728
ENDLESS BELT
Filed Jan. 13, 1966

INVENTOR.
RAGNAR GUDMESTAD
BY
Lieber & Niller
ATTORNEY

United States Patent Office 3,368,728
Patented Feb. 13, 1968

3,368,728
ENDLESS BELT
Ragnar Gudmestad, West Allis, Wis., assignor to Artos Engineering Company, Milwaukee, Wis., a corporation of Wisconsin
Filed Jan. 13, 1966, Ser. No. 520,329
1 Claim. (Cl. 226—172)

ABSTRACT OF THE DISCLOSURE

An endless pulley-driven belt for feeding elongated strands of wire or the like and having a replaceable wear face of flexible elastic material defining the wire feeding surface.

---

The present invention relates generally to improvements in endless belts, and relates more particularly to the provision of an endless pulley-driven belt having a replaceable wear face.

A primary object of the invention is to provide an endless belt adapted to be driven as by means of pulleys or sheaves and having a readily replaceable and disposable band stretched over the periphery thereof to provide an outer replaceable wear face.

BACKGROUND

It has been heretofore proposed to advance or feed articles such as wire or the like from one station to another as by means of a pair or pairs of cooperating belts. Such belts normally are of unitary construction having an inner pulley-engaging face and an outer peripheral face cooperating with the outer peripheral face of an adjacent belt to frictionally engage the article or articles to be advanced. The belts are driven by the pulleys or sheaves in a customary manner either continuously or intermittently to advance the articles between adjacent belt faces. The outer peripheral faces of the feed belts are accordingly subject to considerable wear and tear, and these belts therefore require frequent replacement. Furthermore, the belts are necessarily fabricated of relatively hard and inelastic materials so as not to stretch undesirably between the pulleys or sheaves, and the frictional gripping ability of the belts on the articles being advanced is frequently not of the desired standard. The belts must therefore be adjusted to place the articles under considerable compression to minimize slippage.

In other instances, endless belts are utilized in much the same manner to apply tension to extrusions as by stretching the same under frictional resistance. Also, this general type of belt is often used to drive machine elements through suitable transmission pulleys or the like in which case it is customary to utilize tensioning devices coacting with the outer peripheral surface of the belt. In these and other instances, the outer periphery of the belt is likewise subjected to considerable wear, thus requiring all too frequent replacement of the entire belt and attendant expenses.

SUMMARY

It is therefore an object of this invention to provide an improved composite endless belt which obviates the aforesaid disadvantages and objections of existing one-piece or unitary belts and the need for replacing the entire belt as wear occurs.

Another object of the invention is to provide an improved endless belt adapted to be pulley-driven and having an outer peripheral wear face which is formed by a separate band of inexpensive material having good gripping qualities and which is readily removable and replaceable without need for first removing the belt per se from its drive pulleys.

Still another important object of the invention is to provide an improved two-piece endless belt which is highly effective for use as an article feed belt, which may be readily fabricated at low initial cost to the consumer, which obviates the need for replacement of the entire belt as wear occurs on the outer peripheral portion thereof, and which furthermore minimizes shut-down time of equipment normally occasioned by belt wear and the required need for replacement.

These and other objects and advantages of the present invention are attained by forming the belt of two separate pieces, one of which is in the form of a flexible relatively inelastic band of a given peripheral length and having an inner pulley-engaging face, and the other of which consists of a replaceable flexible elastic band of normally less peripheral length stretched over the periphery of the inelastic band to provide an outer replaceable wear face.

THE DRAWINGS

A clear conception of the features constituting the present improvement and of the construction and mode of operation of a typical embodiment thereof will be had by referring to the accompanying drawing wherein corresponding parts are identified by like reference characters in the several views.

DETAILED DESCRIPTION

While the invention has been shown and described herein as being specifically embodied in an endless pulley-driven belt for feeding or advancing lengths of wire or the like and as having an inner pulley-engaging face of a particular configuration, it is not intended or desired to thereby unnecessarily limit the invention or the utility thereof since endless belts constructed in accordance with the invention may be designed to operate in conjunction with any type of pulley or sheave and for a variety of end uses. It is also contemplated that certain descriptive terminology used herein will be given the broadest possible interpretation consistent wtih the disclosure.

Figure 1:
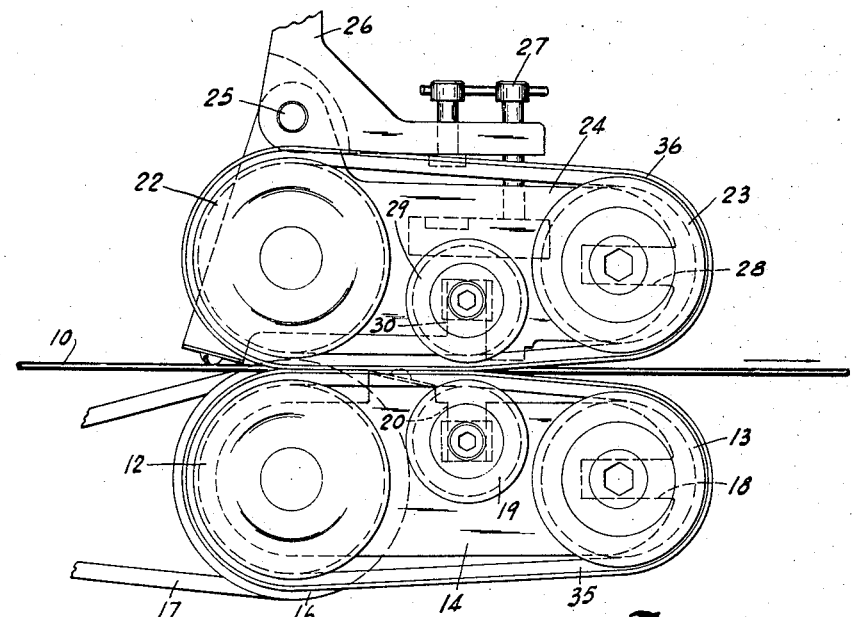
FIG. 1 is a fragmentary side view showing a typical article feeding device utilizing feed belts embodying the features of the present invention.

Referring to FIG. 1 of the drawing, the device shown therein for purposes of illustration is adapted to withdraw elongated articles such as a wire 10 from a source of supply (not shown) and feed the same to a machine or the like (not shown) for the performance of subsequent operations. The feeding device comprises generally, by way of example, two sets of pulleys or sheaves each provided with an endless belt and mounted in adjacent relationship to enable the belts to frictionally grip the wire 10 therebetween.

The lower set of pulleys 12, 13 may be mounted for rotation on a fixed bracket 14, and the pulley 12 may be driven as through a sheave 16 and belt 17 from any suitable source of power such as an electric motor (not shown). The pulley 13 may preferably be rendered adjustable toward and away from the driven pulley 12 as by mounting the same in a slot 18 or the like formed in the mounting bracket 14. The lower pulley assembly may also include an idler pulley 19 or the like slideably adjustable along a vertical slot 20 likewise formed in the bracket 14.

The upper set of pulleys 22, 23 are shown as being mounted for rotation on an adjustable bracket 24 pivotally suspended as at 25 from a support 26 carrying adjustment devices 27 or the like. As in the case of the lower pulley assembly, the pulley 23 may also be rendered adjustable toward and away from the pulley 22 by slidably mounting it in a slot 28 formed in the end of the bracket 24. Similarly, the upper pulley assembly may be provided with an idler pulley 29 slideably adjustable along a slot 30 formed in the bracket 24 in opposing relation to the slot 20 in bracket 14.

The lower pulley assembly is provided with an endless belt 35 which traverses the pulleys 12, 13 as well as the idler pulley 19 which serves as a tension device for applying the desired amount of tension to the belt. Similarly, the upper pulley assembly is provided with an endless belt 36 which traverses the pulleys 22, 23, 29, and the pulley 29 of this set serves to apply the desired tension to the belt 36. Since the belts 35, 36 must be positively driven in order to frictionally engage the wire 10 and advance the same from the supply source to the distributing station, these belts, while flexible, cannot possess too great a degree of elasticity. They are therefore fabricated of a material or materials which are relatively inelastic, and to position or replace the same in their entirety, it is necessary to loosen the pulleys 13, 23 and slide the same along the respective slots 18, 28 toward the pulleys 12, 22 respectively until the belts can be freely removed. Then, after removal and replacement, it is necessary to again readjust the pulleys before the feeder and attendant machinery can be restarted and operated.

Figure 2:
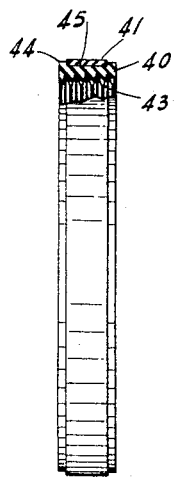
FIG. 2 is a view looking directly at the outer periphery of one of the improved belts with a partial section taken transversely through the belt to more clearly reveal the construction thereof.
Figure 3:
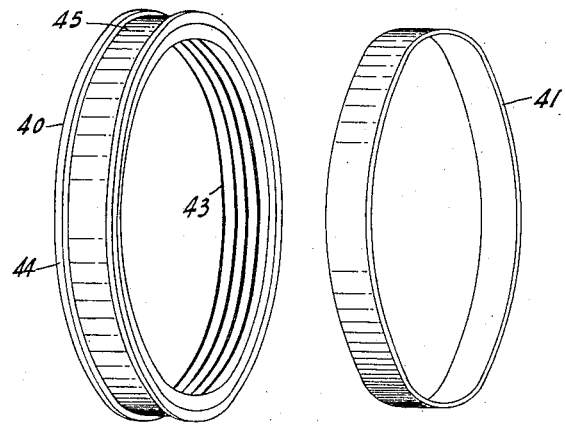
FIG. 3 is an exploded perspective view of the belt of FIG. 2 illustrating the relative dimensions of the two separate bands which make up the composite belt.

The present invention contemplates the provision of a two-piece belt which is adapted especially for use in article feeding devices of the type hereinabove described or in other applications wherein the outer periphery of the belt is subjected to considerable wear as in the case of the belts 35, 36. The two-piece belt embodying this invention is exemplified in FIGS. 2 and 3 and comprises essentially a flexible band 40 formed of relatively inelastic material and a replaceable flexible band 41 formed of elastic material stretched over and seated on the periphery of the band 40.

The relatively inelastic band 40 has its inner face 43 grooved as necessary to seat properly within and engage the belt receiving grooves of the pulleys to which it is to be applied, and in one form of the invention, the outer peripheral face 44 of the band 40 is formed with a groove 45 for receiving the elastic band 41 and preventing displacement thereof. The band 41 may be formed of any suitable elastic material such as, for example, rubber which is capable of being stretched for application to the belt 40 but which possesses inherent recovery properties for snugly engaging the belt 40 once it is applied thereto. As shown particularly in FIG. 3, the band 41 is of less peripheral length than the band 40 and may be stretched thereover without need for removing the belt 40 from the pulleys, thus minimizing shut-down time by obviating the need for loosening and subsequently readjusting the pulleys. The band 41 is of a width permitting snug reception within the groove 45 and is preferably of somewhat greater thickness than the depth of the groove 45 so as to extend outwardly beyond the outer peripheral face of the band 40. Thus, the band 41 provides a readily removable and replaceable wear face for the belt.

Figure 4:
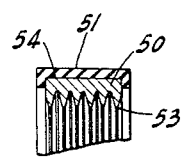
FIG. 4 is a fragmentary transverse section through a somewhat modified endless belt to show another embodiment of the invention.

In the embodiment shown in FIG. 4, the relatively inelastic band 50 is similarly formed with its inner face 53 grooved to conform with the grooves of the pulleys to which it is applied. However, in this embodiment, the band 50 is provided with a plane ungrooved outer peripheral face 54, and the elastic band 51 is of U-shaped cross-section to fit snugly thereover. In effect, the band 51 has a groove formed by the spaced sidewalls thereof, and the distance between these sidewalls is substantially equal to the width of the band 50 to permit snug reception of the band 51 thereon while preventing displacement therefrom. Again, the band 51 should be sufficiently smaller than the band 50 to permit stretching and snug seating thereon, and this band 51 likewise provides a readily removable replaceable wear face for the belt.

Feed belts embodying the invention have been put through extensive tests in feeding insulation covered wire, and the results of these tests have proven exceptionally good. The feed belts, particularly when used in feeding the wire intermittently, and excellent traction qualities due to the selection of material of the replaceable band 41 and the relatively soft and elastic qualities of the replaceable band have minimized damage to the surfaces of the insulation coverings of the wire. Furthermore, since there is always a certain amount of slippage in feeding articles such as wire from a supply reel against the resistance of the reel and guides thus causing wear and tear on the feed belts, the ability to replace only the relatively inexpensive band 41 while retaining the more expensive belt 40 has resulted in considerable savings while still obtaining maximum efficiency. The replaceable bands 41 may, of course, be formed of any suitable materils having the desired stretch and return properties as well as the desired gripping properties, and both rubber and polyurethane have been used to advantage.

Various modes of carrying out the invention are contemplated as being within the scope of the following claim particularly pointing out and distinctly claiming the subject matter that is regarded as the invention.

I claim:

1. An endless belt for feeding elongated stands of wire or the like, said belt comprising, a flexible relatively inelastic band of a given peripheral length having an inner pulley-engaging face and an outer peripheral face provided with a continuous groove of uniform width and depth throughout its length bounded by side walls of uniform thickness and depth, and a replaceable flexible elastic band of less peripheral length stretched over the grooved periphery of said inelastic band and snugly seated within said groove, said elastic band being of substantially the same width as the width of the groove and being of greater thickness than the depth of the groove, whereby said elastic band is bounded by and extends outwardly beyond said groove side walls to define a continuous resilient feeding surface of less width than said inelastic band.

References Cited

UNITED STATES PATENTS

| 2,067,400 | 1/1937 | Koplin et al. | 74—233 |
| 2,377,316 | 6/1945 | Billmeyer | 74—232 |
| 2,695,530 | 11/1954 | Calzolari | 74—232 |
| 2,728,239 | 12/1955 | Adams | 74—233 X |
| 2,985,222 | 5/1961 | Marty et al. | 74—232 X |

FOREIGN PATENTS

| 962,067 | 4/1957 | Germany. |
| 19,950 | 6/1914 | Great Britain. |
| 919,476 | 2/1963 | Great Britain. |

FRED C. MATTERN, JR., *Primary Examiner.*

J. A. WONG, *Assistant Examiner.*